US012131306B2

United States Patent
Guise et al.

(10) Patent No.: US 12,131,306 B2
(45) Date of Patent: Oct. 29, 2024

(54) POINT-OF-SALE SYSTEM HAVING A SECURE TOUCH MODE

(71) Applicant: Block, Inc., Oakland, CA (US)

(72) Inventors: Max Guise, San Francisco, CA (US); Isreal Blagdan, Oakland, CA (US); Bradley T. Hall, San Francisco, CA (US); Trent Weber, San Francisco, CA (US)

(73) Assignee: Block, Inc., Oakland, CA (US)

( * ) Notice: Subject to any disclaimer, the term of this patent is extended or adjusted under 35 U.S.C. 154(b) by 9 days.

(21) Appl. No.: 18/136,221

(22) Filed: Apr. 18, 2023

(65) Prior Publication Data

US 2023/0252441 A1 Aug. 10, 2023

Related U.S. Application Data

(63) Continuation of application No. 17/364,383, filed on Jun. 30, 2021, now Pat. No. 11,669,822, which is a (Continued)

(51) Int. Cl.
*G06Q 20/20* (2012.01)
*G06Q 20/32* (2012.01)

(52) U.S. Cl.
CPC .......... *G06Q 20/206* (2013.01); *G06Q 20/20* (2013.01); *G06Q 20/3278* (2013.01)

(58) Field of Classification Search
CPC .. G06Q 20/206; G06Q 20/20; G06Q 20/3278; G07G 1/0009; G07G 1/0018
See application file for complete search history.

(56) References Cited

U.S. PATENT DOCUMENTS 5,892,900 A 4/1999 Ginter et al.
5,970,146 A 10/1999 Mccall et al.
(Continued)

FOREIGN PATENT DOCUMENTS

CA 2332083 A1 7/2001
JP 5125552 B2 1/2013

OTHER PUBLICATIONS

Loisel Yann, "Designing Next-Generation Payment Terminals That Meet PCI PTS 3.x Requirements", Dated May 19, 2011 (Year: 2011), 14 pages.
(Continued)

*Primary Examiner* — Patrick McAtee
*Assistant Examiner* — Nakia Leffall-Allen
(74) *Attorney, Agent, or Firm* — Maynard Nexsen PC; Brian T. Sattizahn

(57) ABSTRACT

A consumer terminal for a point-of-sale (POS) system used in performing a POS transaction between a merchant and a consumer. The consumer terminal includes a touch screen display having a touch panel, a secure processor in a physically secure area and a main processor in a non-secure area. The main processor is configured to display a series of screens to guide a consumer through the POS transaction. Upon receiving a request for secure data from the main processor, the secure processor instructs the main processor to exit pass-through mode and enter a secure touch mode. Upon a determination that the request for secure data is complete, the secure processor instructs the main processor to exit secure touch mode and return to pass-through mode.

20 Claims, 9 Drawing Sheets

Related U.S. Application Data continuation of application No. 15/428,090, filed on Feb. 8, 2017, now Pat. No. 11,080,675, which is a continuation of application No. 14/848,123, filed on Sep. 8, 2015, now abandoned.

(56) References Cited

U.S. PATENT DOCUMENTS

| | | | |
|---|---|---|---|
| 6,062,477 A | 5/2000 | Wike et al. | |
| 6,595,342 B1 | 7/2003 | Maritzen et al. | |
| 6,609,101 B1 | 8/2003 | Landvater et al. | |
| 7,092,929 B1 | 8/2006 | Dvorak et al. | |
| 7,212,976 B2 | 5/2007 | Scheer | |
| 7,222,786 B2 | 5/2007 | Renz et al. | |
| 7,552,066 B1 | 6/2009 | Landvater et al. | |
| 7,866,546 B1 | 1/2011 | Vance et al. | |
| 7,941,331 B2 | 5/2011 | Dogan et al. | |
| 8,001,017 B1 | 8/2011 | Franco | |
| 8,117,125 B1 | 2/2012 | Kawan et al. | |
| 8,121,876 B1 | 2/2012 | Braumoeller et al. | |
| 8,204,799 B1 | 6/2012 | Murray et al. | |
| 8,261,064 B2 | 9/2012 | Ditzman et al. | |
| 8,417,572 B1 | 4/2013 | Chenault | |
| 8,533,053 B2 | 9/2013 | Brown et al. | |
| 8,732,040 B1 | 5/2014 | Prabhune et al. | |
| 8,768,838 B1 | 7/2014 | Hoffman | |
| 8,788,428 B2 | 7/2014 | Weston et al. | |
| 8,944,322 B2 | 2/2015 | White | |
| 9,129,274 B1 | 9/2015 | Mocko et al. | |
| 9,519,901 B1 | 12/2016 | Dorogusker | |
| 9,589,428 B2 | 3/2017 | Edwards et al. | |
| 9,639,840 B2* | 5/2017 | Ninomiya | G06Q 20/20 |
| 9,741,211 B2 | 8/2017 | Skiles | |
| 9,965,116 B1 | 5/2018 | Wolter | |
| 10,121,136 B2 | 11/2018 | Mocko et al. | |
| 10,496,975 B2 | 12/2019 | Rezayee et al. | |
| 10,592,886 B2 | 3/2020 | Sanchez-Llorens et al. | |
| 10,733,588 B1 | 8/2020 | Mocko et al. | |
| 10,909,486 B1 | 2/2021 | Tsou | |
| 10,949,796 B1 | 3/2021 | Tsou | |
| 10,949,846 B2 | 3/2021 | Sanchez-Llorens et al. | |
| 11,080,675 B1 | 8/2021 | Guise et al. | |
| 11,308,472 B2 | 4/2022 | Sanchez-Llorens et al. | |
| 11,334,861 B2 | 5/2022 | Sanchez-Llorens et al. | |
| 11,514,452 B2 | 11/2022 | Sanchez-Llorens et al. | |
| 11,669,822 B2 | 6/2023 | Guise et al. | |
| 2002/0072988 A1 | 6/2002 | Aram | |
| 2002/0133368 A1 | 9/2002 | Strutt et al. | |
| 2002/0166891 A1 | 11/2002 | Stoutenburg et al. | |
| 2003/0033179 A1 | 2/2003 | Katz et al. | |
| 2003/0046133 A1 | 3/2003 | Morley et al. | |
| 2003/0135751 A1 | 7/2003 | O'Donnell et al. | |
| 2004/0030428 A1 | 2/2004 | Crampton et al. | |
| 2004/0043650 A1 | 3/2004 | Yang et al. | |
| 2005/0039052 A1 | 2/2005 | O'Donnell et al. | |
| 2005/0283403 A1 | 12/2005 | Ramirez et al. | |
| 2006/0195563 A1 | 8/2006 | Chapin et al. | |
| 2006/0226224 A1 | 10/2006 | Henry | |
| 2006/0235739 A1 | 10/2006 | Levis et al. | |
| 2008/0147507 A1 | 6/2008 | Langhammer | |
| 2008/0209212 A1 | 8/2008 | Ditzman et al. | |
| 2008/0228582 A1 | 9/2008 | Fordyce et al. | |
| 2009/0102813 A1 | 4/2009 | Mamba et al. | |
| 2009/0112768 A1 | 4/2009 | Hammad | |
| 2009/0173790 A1 | 7/2009 | Hart et al. | |
| 2009/0299794 A1 | 12/2009 | Marchi et al. | |
| 2009/0307142 A1 | 12/2009 | Mardikar | |
| 2010/0057620 A1 | 3/2010 | Li et al. | |
| 2010/0169130 A1 | 7/2010 | Fineman et al. | |
| 2010/0262504 A1 | 10/2010 | Tamura | |
| 2011/0176004 A1 | 7/2011 | Chaussade | |
| 2011/0199308 A1 | 8/2011 | Nativel et al. | |
| 2011/0225023 A1 | 9/2011 | Evens et al. | |
| 2011/0321173 A1 | 12/2011 | Weston et al. | |
| 2012/0041675 A1 | 2/2012 | Juliver et al. | |
| 2012/0054076 A1 | 3/2012 | Wu et al. | |
| 2012/0066079 A1 | 3/2012 | Falzone et al. | |
| 2012/0084119 A1 | 4/2012 | Vandehey et al. | |
| 2012/0290420 A1* | 11/2012 | Close | G06Q 20/20 705/16 |
| 2013/0124346 A1 | 5/2013 | Baldwin et al. | |
| 2013/0153656 A1 | 6/2013 | Skiles | |
| 2013/0155595 A1 | 6/2013 | Herring et al. | |
| 2013/0246171 A1 | 9/2013 | Carapelli | |
| 2014/0022211 A1 | 1/2014 | Karpin et al. | |
| 2014/0095387 A1* | 4/2014 | Colnot | G06Q 20/3227 705/44 |
| 2014/0096222 A1* | 4/2014 | Colnot | G06F 21/74 726/5 |
| 2014/0097249 A1 | 4/2014 | Gomez et al. | |
| 2014/0164126 A1 | 6/2014 | Nicholas et al. | |
| 2014/0172607 A1 | 6/2014 | Skiles | |
| 2014/0180959 A1 | 6/2014 | Gillen et al. | |
| 2014/0214688 A1 | 7/2014 | Weiner et al. | |
| 2014/0222711 A1 | 8/2014 | Tibbs et al. | |
| 2014/0252089 A1 | 9/2014 | Bostwick | |
| 2014/0256251 A1 | 9/2014 | Caceres et al. | |
| 2014/0297470 A1 | 10/2014 | Ramadge et al. | |
| 2015/0032502 A1 | 1/2015 | Green et al. | |
| 2015/0095091 A1 | 4/2015 | Kamdar | |
| 2015/0095134 A1 | 4/2015 | Parker et al. | |
| 2015/0095241 A1 | 4/2015 | Edwards | |
| 2015/0100498 A1 | 4/2015 | Edwards | |
| 2015/0161564 A1 | 6/2015 | Sweeney et al. | |
| 2015/0199882 A1 | 7/2015 | Fernando et al. | |
| 2015/0261314 A1 | 9/2015 | Herring et al. | |
| 2015/0269521 A1 | 9/2015 | Knapp et al. | |
| 2015/0363757 A1 | 12/2015 | Mocko et al. | |
| 2016/0005020 A1 | 1/2016 | Fernando et al. | |
| 2016/0012465 A1 | 1/2016 | Sharp | |
| 2016/0051067 A1 | 2/2016 | Law et al. | |
| 2016/0124627 A1 | 5/2016 | Beatty et al. | |
| 2016/0358147 A1 | 12/2016 | Edwards et al. | |
| 2017/0221035 A1 | 8/2017 | Edwards et al. | |
| 2017/0311737 A1 | 11/2017 | Law et al. | |
| 2018/0039965 A1 | 2/2018 | Han et al. | |
| 2019/0303905 A1 | 10/2019 | Sanchez-Llorens et al. | |
| 2021/0326826 A1 | 10/2021 | Guise et al. | |
| 2023/0067746 A1 | 3/2023 | Tilahun et al. | |

OTHER PUBLICATIONS

"2019 Revised Patent Subject Matter Eligibility Guidance", Federal Register, vol. 84, No. 4, (Jan. 7, 2019), pp. 50-57.

Chen et al., "A Staggered Ordering Policy for One-Warehouse, Multi Retailer Systems," Operations Research, vol. 48, Issue 2, pp. 281-293 (Mar.-Apr. 2000).

"E-solutions for surplus inventory" Myers, Chuck. DSN Retailing Today 39.21: 13. Lebhar-Friedman, Inc. (Nov. 6, 2000), 4 pages.

Fox et al., II, "The Poker Chip Game: A Multi-product, Multi-customer, Multi-echelon, Stochastic Supply Chain Network Useful for Teaching the Impacts of Pull versus Push Inventory Policies on Link and Chain Performance," INFORMS Transactions on Education, vol. 6, Issue 3, pp. 3-19 (Year: 2006).

"Oct. 2019 Update: Subject Matter Eligibility", (Oct. 17, 2019), 22 pages.

Ross, D.F., "Replenishment Inventory Planning," Chapter 7 of Distribution Planning and Control: Managing in the Era of Supply Chain Management, Chapman & Hall, pp. 263-319 (1996).

"TradeOut aims to move out excess inventory" Smith, Eric. American Metal Market 107.218: 8. Euromoney Institutional Investor PLC. (Nov. 11, 1999), 3 pages.

* cited by examiner

POINT-OF-SALE SYSTEM HAVING A SECURE TOUCH MODE

CROSS-REFERENCE TO RELATED APPLICATIONS

This application is a continuation of U.S. application Ser. No. 17/364,383, filed on Jun. 30, 2021, entitled "A POINT-OF-SALE SYSTEM HAVING A SECURE TOUCH MODE," which is a continuation of U.S. application Ser. No. 15/428,090, filed on Feb. 8, 2017, entitled "A POINT-OF-SALE SYSTEM HAVING A SECURE TOUCH MODE," and granted as U.S. Pat. No. 11,080,675, which is a continuation of U.S. application Ser. No. 14/848,123, filed on Sep. 8, 2015, entitled "A POINT-OF-SALE SYSTEM HAVING A SECURE TOUCH MODE," which applications are incorporated herein by reference in their entirety.

BACKGROUND

Consumers can interact with merchants to conduct various transactions. For example, a consumer can conduct a transaction with a merchant at a point-of-sale system using cash, a transaction card, or other transaction instrument. Many transactions require that the consumer sign a physical receipt, electronically approve a transaction, e.g., by pressing an approve button on a user interface, electronically sign for the transaction, e.g., with a stylus or finger on an electronic signature capture device with a touch sensitive pad, or enter an authorizing personal identification number (PIN), many of which techniques require additional transaction electronics and time.

BRIEF DESCRIPTION OF THE DRAWINGS

In order to describe the manner in which features of the disclosure can be obtained, a more particular description of the principles will be rendered by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DETAILED DESCRIPTION

System, devices, methods, and non-transitory computer-readable media are disclosed in accordance with various embodiments of the present disclosure overcome one or more of the above-referenced and other deficiencies in conventional approaches to point of sale systems. In particular, in accordance with various embodiments, approaches provide for a payment object reader that is used in performing a payment transaction at a point-of-sale system.

A point-of-sale system includes a merchant terminal configured to guide a merchant through a series of merchant steps in a point-of-sale transaction, and a consumer terminal configured to guide a consumer through a series of consumer steps in the point-of-sale transaction. The consumer terminal includes both a non-secure area and a physically secure area. The non-secure area of the consumer terminal includes a main non-secure processor, a display and a touch panel. The physically secure area of the consumer terminal includes a secure processor and a microcontroller. The microcontroller in the physically secure area receives touch events at the touch panel of the consumer terminal during the point-of-sale transaction. The microcontroller either passes the touch events through to the non-secure processor, or prevents the touch events from being passed through to the non-secure processor, depending upon the mode of operation of the secure area of the consumer terminal.

When a point-of-sale transaction commences, the physically secure area operates in a pass-through mode where inputs to the touch panel are received at the microcontroller in the physically secure area and the microcontroller passes the inputs through to the non-secure processor. Upon receiving a request from the non-secure processor for a personal identification number (PIN) entry, the physically secure area operates in a secure touch mode, where inputs to the touch panel are received at the microcontroller and the microcontroller does not pass any data to the non-secure processor. Rather, in the secure touch mode, the secure processor processes the touch events, for example by decoding the incoming touch events, and aggregating the touch events into a PIN block. The PIN data can be provided to an ICC card, or as an encrypted PIN block from the secure processor to the non-secure processor. Upon completion of the PIN entry, the non-secure processor exits the secure touch mode and returns to the pass-through mode. In the pass-through mode, touch events at the touch panel are received at the microcontroller and are passed through to the non-secure processor.

Other advantages, variations, and functions are described and suggested below as can be provided in accordance with the various embodiments.

Figure 1:
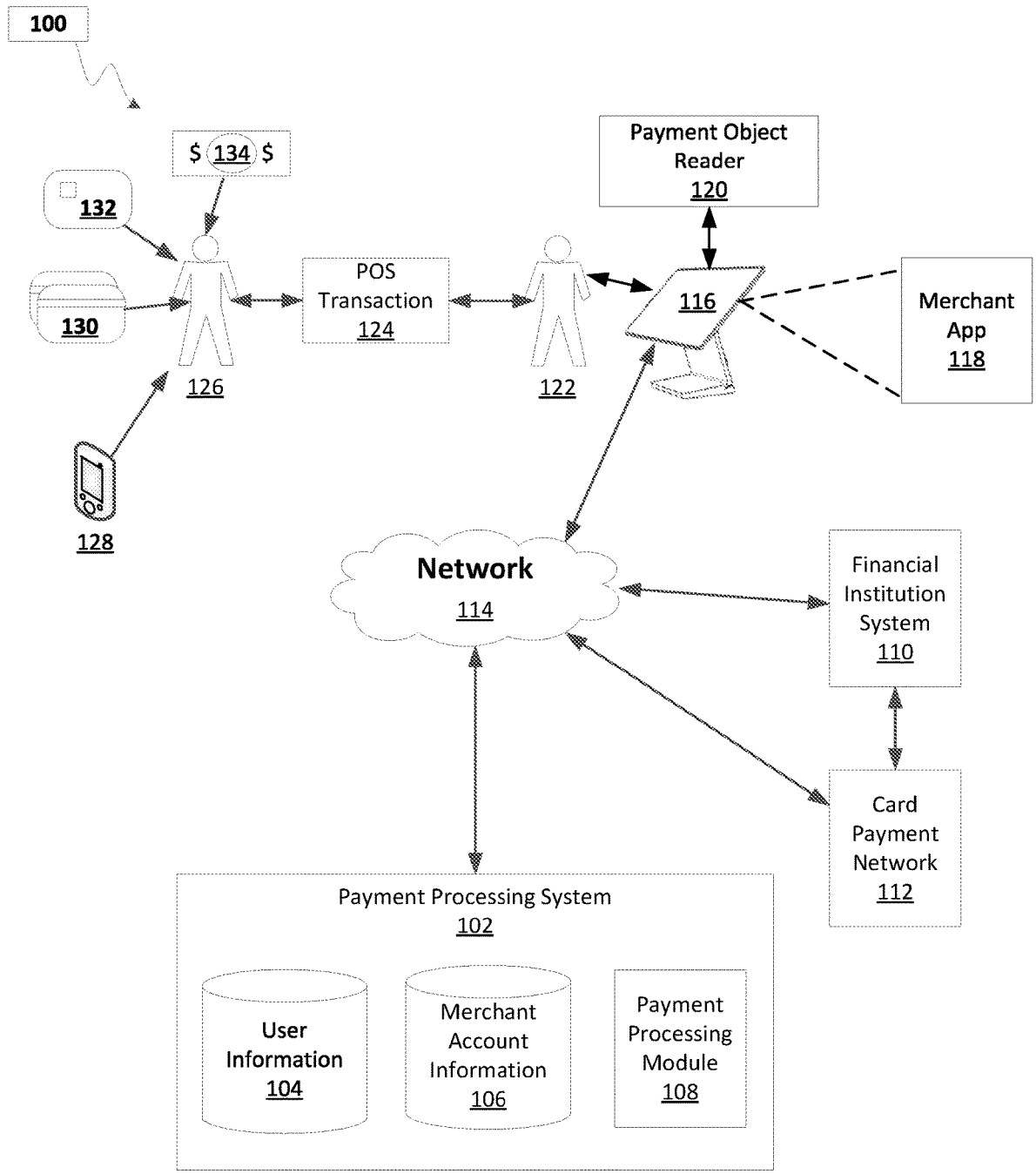
FIG. 1 illustrates an example architecture of a payment communication system for enabling transactions between merchants and buyers.

FIG. 1 illustrates an example architecture of a payment communication system 100 for enabling point-of-sale (POS) transactions between merchants 122 and buyers 126. In the example of FIG. 1, a buyer 126 can use any of a variety of payment objects, such as payment cards 130, 132 or cash 134 when participating in a POS transaction 124 with a merchant 122. A buyer 126 can typically have payment cards 130, 132 such as credit cards, debit cards, prepaid cards, and the like, that the buyer 126 can use for conducting a POS transaction 124. In some embodiments, the payment cards 130 can include one or more magnetic stripes for providing payment object and buyer information when swiped in a payment object reader 120 communicatively coupled to a merchant device 116. In some embodiments, other types of payment objects can be used, for example smart cards 132 having a built in integrated circuit including a memory chip (i.e., EMV payment objects), a radio frequency identification tag (i.e., near field communication (NFC) enabled objects), and the like. In some embodiments, the user 126 can use the user device 128 to conduct NFC payment transactions through communication between the user device 128 and the payment object reader device 120, for example. In some embodiments, the user device 128 can be replaced with a consumer terminal coupled to the merchant terminal 116, which can for example be the point-of-sale system 700 shown in FIGS. 7-10, and in particular the merchant terminal 710 and the consumer terminal 810 in some embodiments. In some embodiments, the user device 128 can be used to interact with a consumer terminal (for example consumer terminal 810) to perform certain transactions, such as a transaction using an NFC enabled device of the consumer.

The payment communication system 100 in the example of FIG. 1 illustrates a merchant point of sale device 116 associated with the merchant 122 that participates in the payment service provided by the service provider of the payment processing system 102. The merchant device 116 can be a computing device (e.g., a mobile computing device) able to communicate with the payment processing system 102, and with various other computing devices, through suitable communication protocols, interfaces, and networks, including network 114. Further, the merchant device 116 can be any appropriate device operable to send and receive requests, messages, or other types of information over the network 114. Additionally, while only a single merchant device 116 is illustrated in the example of FIG. 1, in some embodiments there can be additional merchant devices depending on the number of merchants participating in the payment service, or a plurality of components arranged as a POS system. Refer to FIGS. 7-10 for example point-of-sale systems including a merchant terminal 710 and a consumer terminal 810.

Each merchant device 116 can include an instance of a merchant application 118 executed on the merchant device. The merchant application 118 can provide POS functionality to enable the merchant 122 to accept payments at a POS location using the merchant device 116. In some types of businesses, the POS location can correspond to a store or other place of business of the merchant, and thus, can be a fixed location that typically does not change on a day-to-day basis. In other types of businesses, however, the POS location can change from time to time, such as in the case that the merchant 122 operates a food truck, is a street vendor, a cab driver, or has an otherwise mobile business, e.g., in the case of merchants who sell items at buyers' homes, buyers' places of business, and so forth.

The merchant device 116 is communicatively coupled to a payment object reader 120, either by direct connection, for example through an audio jack of the mobile phone connected to an audio plug of the payment object reader, or through wireless connection, such as WiFi, BlueTooth, BLE (Bluetooth low energy), NFC, or other appropriate short-range communication. The payment object reader can read data from a magnetic stripe card or an EMV chip-type card and communicate the data to the mobile phone. The payment object reader can also read data from an NFC device and communicate the data to the merchant device 116. The payment object reader is shown as being coupled to the merchant device 116, however in some embodiments, the payment object reader can be integral with the merchant device 116.

Accordingly, the merchant 122 and the buyer 126 can conduct a POS transaction 124 by which the buyer 126 acquires an item or service from the merchant 122 at a POS location. The merchant application 118 on the merchant device 116 can send transaction information to the payment processing system 102, e.g., as the transaction is being conducted at the POS location. In some embodiments, such as if a particular merchant device 116 is not connected to the network 114 and is therefore processing transactions offline, the transaction information can be sent in a batch at a subsequent point in time or using other suitable techniques. In some embodiments, the transaction information can be sent via SMS, MIMS, or a voice call.

In some embodiments, the payment system is configured to send and receive data to and from the user device and the merchant device. For example, the payment system can be configured to send data describing merchants to the user device using, for example, the information stored in the merchant account information database 106. The data describing merchants can include, for example, a merchant name, geographic location, contact information, and an electronic catalogue, e.g., a menu that describes items that are available for purchase from the merchant.

In some embodiments, the payment system can also be configured to communicate with a computer system of a card payment network 112, e.g., Visa or MasterCard, etc., over the network, or over a different network, for example, to conduct electronic financial transactions. The computer system of the card payment network can communicate with a computer system of a card issuer 110, e.g., a bank. There can be computer systems of other entities, e.g., the card acquirer, between the payment system and the computer system of the card issuer.

The payment system can then communicate with the computer system of a card payment network 112 to complete an electronic financial transaction for the total amount to be billed to the consumer's financial account. Once the electronic financial transaction is complete, the payment system can communicate data describing the card-less payment transaction to the user device, e.g., an electronic receipt, which can, for example, notify the consumer of the total amount billed to the user for the card-less payment transaction with the particular merchant.

To accept electronic payments using the POS system 100, the merchant 122 typically creates a merchant account with the payment processing system 102 by providing information describing the merchant including, for example, merchant name, contact information (e.g., telephone numbers, the merchant's address, and one or more financial accounts to which funds collected from buyers will be deposited).

This merchant information can be securely stored by the service provider, for example, as merchant account information 106 in a secure database. Further, the merchant information can include a merchant profile created for each merchant. The merchant profile can include information about the merchant 122 and transaction information associated with transactions conducted by the merchant. User information 104 can likewise be securely stored by the payment processing system 102 for the customers to enable customers to conduct various financial transactions.

The payment processing system 102 enables a service provider to provide a payment service in which merchants 122 are able to conduct POS transactions 124 with a plurality of buyers 126, such as for selling services and/or products to the buyers 126. The payment processing system 102 can include one or more servers that are configured to process secure electronic financial transactions, e.g., payment during a POS transaction 124, by communicating with the merchant device 116, card payment networks 112, and bank or other financial institution payment systems 110. The payment processing system 102 includes a payment processing module 108 that receives transaction information for processing payments made through the merchant application 118. For example, the payment processing module 108 can receive transaction information, such as an amount of the transaction, and can verify that a particular payment card 130, 132 can be used to pay for the transaction, such as by contacting a card clearinghouse of a card payment network 112. Furthermore, in some examples, the payment processing module 108 can redirect payment information for transactions to be made using payment cards 130, 132 to a bank, or other financial institution, payment system 110. In other embodiments, the merchant device 116 can communicate directly with an appropriate card payment network 112 or bank payment system 110 for approving or denying a transaction using a particular payment card 130, 132 for a POS transaction 124.

As introduced above, the payment processing system 1210 can be configured to communicate with one or more systems of a card payment network (e.g., MasterCard®, VISA®, or the like) over the network to conduct financial transactions electronically. The payment processing system 1210 can also communicate with one or more bank payment systems of one or more banks over the network. For example, the payment processing system 1210 can communicate with an acquiring bank, a payment card issuing bank, and/or a bank maintaining buyer accounts for electronic payments.

A payment card acquiring bank can be a registered member of a card association (e.g., Visa®, MasterCard®, or the like), and can be part of a card payment network A payment card issuing bank can issue payment cards to buyers, and can pay acquiring banks for purchases made by cardholders to which the issuing bank has issued a payment card. Accordingly, in some embodiments, the systems of an acquiring bank can be included in the card payment network and can communicate with systems of a payment card issuing bank to obtain payment. Further, in some embodiments, bank payment systems can include systems associated with debit card issuing institutions, in which case, the systems of the debit card issuing institution can receive communications regarding a transaction in which the buyer uses a debit card instead of a credit card. Additionally, there can be systems of other financial institutions involved in some types of transactions or in alternative system architectures and thus, the foregoing are merely several examples.

The network 114 can be a conventional type, wired or wireless, and can have numerous different configurations including a star configuration, token ring configuration, or other configurations. Furthermore, the network 114 can include an intranet, a local area network (LAN), a wide area network (WAN) (e.g., the Internet), and/or other interconnected data paths across which multiple devices can communicate. In some embodiments, the network 114 can be a peer-to-peer network. The network 114 can also be coupled with or include portions of a telecommunications network for sending data using a variety of different communication protocols. In some embodiments, the network 114 can include Bluetooth (or Bluetooth low energy) communication networks or a cellular communications network for sending and receiving data including via short messaging service (SMS), multimedia messaging service (MMS), hypertext transfer protocol (HTTP), direct data connection, WAP, email, etc. Although the example of FIG. 1 illustrates one network 114 coupled to the merchant device, payment processing system, card payment network, and bank, more that one network 114 can connect these entities. The payment system, the merchant device, and the user device can communicate over the network using wired or wireless connections, or combinations thereof.

Figure 2:
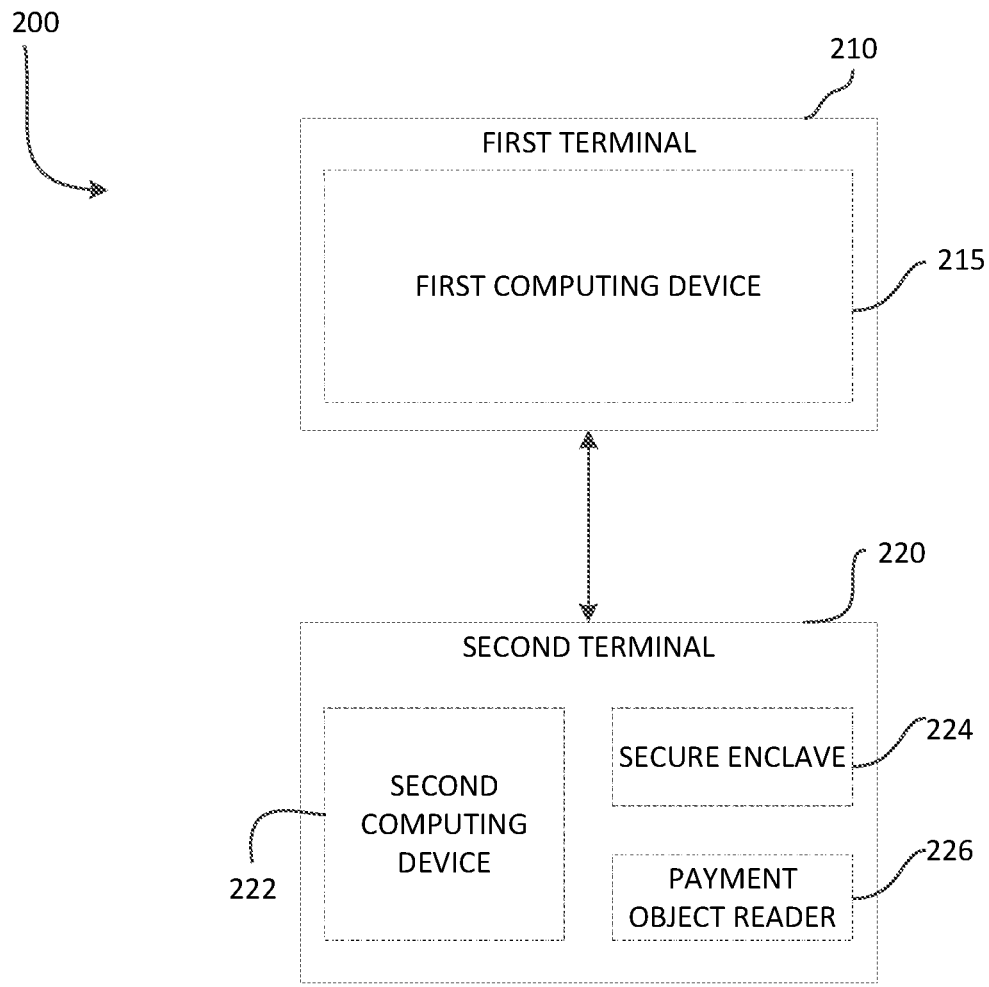
FIG. 2 illustrates an example block diagram showing a first terminal and a second terminal used in a point-of-sale system in accordance with various embodiments.

Reference is now made to FIG. 2 illustrating an example block diagram showing a first terminal and a second terminal used in a point-of-sale system in accordance with various embodiments. The example point-of-sale system 200 includes a first terminal 210 including a first computing device 215 (e.g., a tablet computer, a mobile phone, etc.). The computing device can be integrally provided as a component of the first terminal to form a unitary structure or a computing device provided by a manufacturer that is separately provided and inserted into the terminal by the appropriate user. The computing device can include, for example, a processor, a touch-screen display, and a wireless local area network receiver, a physical interface for electronic communication, and a physical interface to receive power (which can be integrated with the physical interface for electronic communication, e.g., in a Universal Serial Bus (USB) connector or other proprietary connector). The first terminal 210 is detachably mated to a second terminal 220.

The computing device can run a merchant application or other financial transaction software that can provide functionality to facilitate a point-of-sale such as by enabling payment transactions. For example, in accordance with various embodiments, the merchant application can be downloaded and installed on the computing device. The software can be configured to operate with a card reader, where an individual can complete a financial transaction by swiping a magnetic stripe card through the card reader or dipping a chip-type card into the card reader that is connected to the computing device. In this example, the financial transaction can be any transaction that involves receiving or sending payment from one person or entity to another. The magnetic stripe card can be, for example, a credit card, a debit card, or other types of payment authenticating pieces having a magnetic stripe storing information sufficient to carry out the financial transaction. In accordance with various embodiments, the card reader can be integrated into the consumer terminal to allow the consumer to properly provide the payment card. However, in some embodiments, a separate card reader can be used, such as a miniaturized card reader that is easily connectable to the computing device.

The first terminal 210 and second terminal 220 can be in communication with each other via a wired or wireless link. In this example, the first terminal 210 represents a terminal used by a merchant conducting a transaction at a point-of-sale system with a consumer using, for example, a payment card via the second terminal 220. It is noted that although a payment card is used in some embodiments, transactions can also be conducted through a card-less payment account that is linked to the payment card. Other transactions include person-to-person, account-to-account, electronic cash, among others. It should be further noted that although a credit card is shown to conduct transactions, approaches described herein apply to other types of financial payment instruments including, for example, debit cards, chip-type cards, and card-less payment accounts. As described, in conventional point-of-sale systems, the equipment can be costly and large, requiring additional space and resources. Further, in retail stores where space is limited, a merchant may find it less desirable to have such a large system. Accordingly, in accordance with various embodiments, approaches provide for a streamlined point-of-sale system with a merchant terminal and a consumer terminal detachably mated from the merchant terminal. It is further desirable to securely process and store entries securely entered into the consumer terminal.

The second terminal 220 supports a second computing device 222. The second computing device 222 is shown integrally formed within the second terminal 220 to provide a single one-piece structure. In some embodiments, another tablet provided separately by the same or another manufacturer, can be inserted into/a component of the second terminal 220. The second terminal 220 includes a secure enclave 224 for securely processing and storing entries into the second terminal 220, as described in greater detail herein. The second terminal 220 also includes a card reader 226 configured to read both magnetic swipe cards and chip-type cards. Although shown here as a single hybrid slot capable of reading both card types, two readers, in the form of two separate slots, can be provided with one "swipe" slot for receiving a magnetic swipe-type card and a "dip" slot for receiving a chip-type card.

The second computing device 222 can include an LCD or other appropriate display, driven by the main processor of the second computing device 222. The second terminal 220 can further include a speaker and/or headphone jack in some embodiments for playing sounds related to various transactions and/or to provide ADA-related services. A USB or other appropriate communication port(s) can be provided for communication to the first terminal 210.

Figure 3:
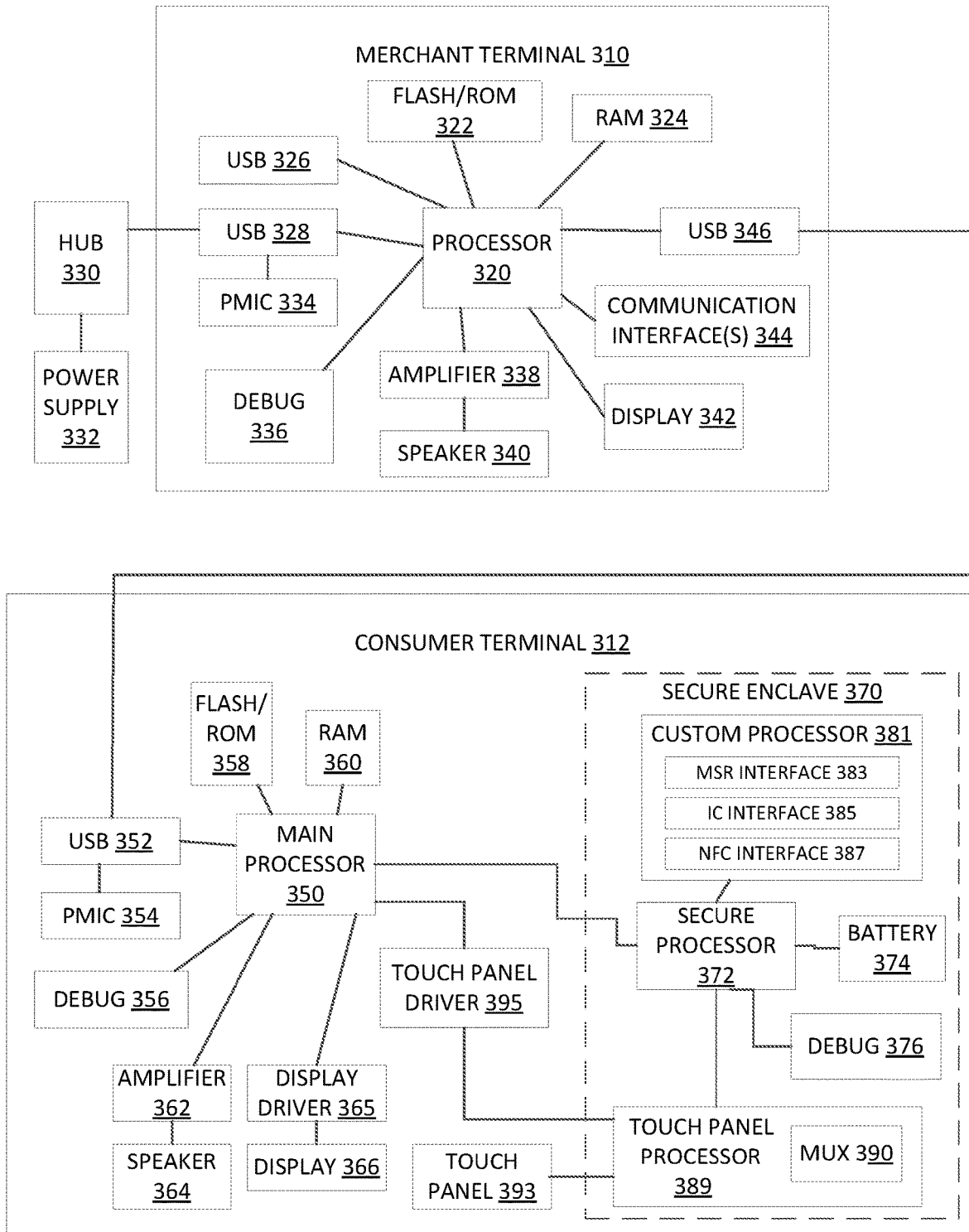
FIG. 3 illustrates an example schematic diagram of components of each terminal in a point-of-sale system for enabling transactions between merchants and buyers.

Reference is now made to FIG. 3 illustrating an example schematic diagram of components of each terminal in the point-of-sale system in accordance with an embodiment. The point-of-sale system 300 includes a merchant terminal 310 and a consumer terminal 312. The merchant terminal 310 includes non-transitory computer readable instructions stored in memory 322 that when interpreted by a merchant terminal processor causes the merchant terminal processor to display a series of screens in a display of the merchant facing graphical user interface for guiding a merchant through a point of sale transaction. The consumer terminal 312 includes non-transitory computer readable instructions stored in memory 358 that when interpreted by a non-secure consumer terminal processor causes the non-secure consumer terminal processor to display a series of screens in a consumer facing graphical user interface on the display for guiding the consumer through the point-of-sale transaction.

The merchant terminal 310 includes a SoC (System-on-chip) processor 320 and associated flash memory 322 and RAM 324. A USB-A port 326 is provided for connecting other devices or components to the merchant terminal 310 as appropriate. A USB+Power port 328 is provided connected to a hub 330 for various peripherals associated with a point-of-sale system, including a receipt printer, cash drawer, barcode scanner, scale, keyboard, USB-Ethernet dongle/USB mifi, and other point-of-sale peripheral components known in the art. The hub 330 can be a 5-port USB hub in some embodiments. While both a USB-A port and a USB+Power port are separately identified, such should not be considered limitation. Additionally, although the connectors are shown as being USB, any universal adapter can be implemented to connect other devices to the merchant terminal and to connect the merchant terminal to the consumer terminal. A Power Management Integrated Circuit (PMIC) 334 is in communication with the micro USB connector 328. A PMIC is an integrated circuit for managing power requirements of the host system. Merchant terminal can have any number of USB ports, and the ports can be of any suitable characteristics. A power supply 332 can be provided as power through the hub 330 via connector 328 on the merchant terminal 310. In some embodiments, power can be provided directly to the merchant terminal, for example via USB connector 326. A debug application 336 is provided for appropriate debugging of the merchant terminal 310 and the various components thereof. An audio amplifier 338 is provided and a speaker 340 for providing the appropriate audio for the merchant terminal 310. A display 342 can be connected to the processor 320, for example a 13.3-inch LCD display having a resolution of 1920×1080 IPS 166 PPI. The display 342 provides the interfaces and outputs to the merchant terminal 310 to be viewed by a merchant. A communication interface(s) 344 is in communication with the processor 320 to perform the communication for the merchant terminal, for example, with the consumer terminal and other point-of-sale system components, or for example a payment system. The communication interface 344 can include one or more interfaces and hardware components for enabling communication with various other devices, such as over the network(s) 114 shown in FIG. 1. For example, communication interface 344 can enable communication through one or more of the internet, cable networks, wireless networks (e.g., Wi-Fi), and wired networks, as well as close-range communications, such as Bluetooth®, Bluetooth® Low Energy (BLE), near field communication (NFC) and the like, as additionally enumerated elsewhere herein. The communication interface(s) can include a GPS transceiver, a Wi-Fi transceiver, and other appropriate communication mediums.

In some embodiments, the communication interface 344 can include a cellular communications transceiver for sending and receiving data over a cellular communications network such as via voice call, short messaging service (SMS), multimedia messaging service (MMS), hypertext transfer protocol (HTTP), direct data connection, WTP, e-mail or another suitable type of electronic communication. In some embodiments, the communication interface 344 also provides other conventional connections to the network for distribution of files and/or media objects using standard network protocols such as TCP/IP, HTTP, HTTPS and SMTP, etc.

A USB port 346 is provided for detachably connecting the merchant terminal 310 to the consumer terminal 312. The term "detachably" is intended to refer to the ability for the merchant terminal to be connected to the consumer terminal but also configured to being detached from the consumer terminal when desired for storage, upgrades, or other uses.

This mating between the terminals can be through direct wired connections shown or wirelessly, in some embodiments.

Other components included in the merchant terminal 310 can include various types of sensors (not shown), which can include a GPS device, an accelerometer, gyroscope, compass, proximity sensor, etc. Additionally, the merchant terminal 310 can include various other components that are not shown, examples of which includes removable storage, an internal power source such as a battery and a power control unit, and so forth.

The consumer terminal 312 includes a processor 350 connected to the micro USB 352 for communication with the merchant terminal 310. The processor 350 can be a system on a chip (SoC) processor in some embodiments. A Power Management Integrated Circuit (PMIC) 354 is in communication with the micro USB connector 352. A PMIC is an integrated circuit for managing power requirements of the host system. A debug application 356 is provided for the processor 350 for the appropriate debugging of the consumer terminal 312 and the various components thereof. The processor 350 is coupled to flash memory 358 and RAM 360 for appropriate storage and processing of data. An audio amplifier 362 and speaker 364 are provided for any audio for the consumer on the consumer terminal 312. A display 366 is provided, such as a 7-inch LCD touch-screen display having a resolution of 1280×800 IPS 216 PPI. The display 366 provides interfaces and the outputs of the point-of-sale system to the consumer terminal 312. A display driver 365 controls the display 366.

Memory in the merchant terminal 310 and the consumer terminal 312, including flash/ROM 322, RAM 324, flash/ROM 358 and RAM 360 are examples of non-transitory computer storage media (e.g., computer-readable media) and can include volatile and non-volatile memory and/or removable and non-removable media implemented in any type of technology for storage of information such as computer-readable processor-executable instructions, data structures, program applications or other data. The computer-readable media can include, but is not limited to, RAM, ROM, EEPROM, flash memory, solid-state storage, magnetic disk storage, optical storage, and/or other computer-readable media technology. Further, in some cases, the merchant device 310 can access external storage, such as RAID storage systems, storage arrays, network attached storage, storage area networks, cloud storage, or any other medium that can be used to store information and that can be accessed by the processor directly or through another computing device or network. Accordingly, the memory 322, 324 or 358, 360 can be computer storage media able to store instructions, applications or components that can be executed by the processor 320 or 350, respectively.

The display 366 of the consumer terminal 312 (and, likewise the display 342 of the merchant terminal 310) can employ any suitable display technology. For example, the display 342 and the display 366 can be a liquid crystal display (LCD), a plasma display, a light emitting diode (LED) display, an OLED (organic light-emitting diode) display, an electronic paper display, or any other suitable type of display able to present digital content thereon. The consumer terminal can include a touch panel 393 associated with the display 366 to provide a touchscreen display configured to receive touch inputs for enabling interaction with a graphical user interface presented on the display. Accordingly, embodiments described herein are not limited to any particular display technology. In some embodiments, the merchant device may not include a display, and information can be presented via the speaker 364.

The consumer terminal 312 includes a secure enclave 370 is included in the consumer terminal 312. The secure enclave includes a secure processor 372 coupled to the main terminal processor 350, an anti-tamper battery 374, and a secure debug application 376. Each processor, including the merchant terminal processor 320, the consumer terminal main processor 350, the secure processor 372, the custom processor 381 and the touch panel processor 389, can each comprise one or more processors or processing cores. For example, the processor(s) 320, 350, 372, 381 and 389 can be implemented as one or more microprocessors, microcomputers, microcontrollers, digital signal processors, central processing units, state machines, logic circuitries, and/or any devices that manipulate signals based on operational instructions. In some embodiments, the processor(s) 320, 350, 372, 381 and 389 can be one or more hardware processors and/or logic circuits of any suitable type specifically programmed or configured to execute the algorithms and processes described herein by performing various input/output, logical, and/or mathematical operations. The processor(s) 320, 350, 372, 381 and 389 can be configured to fetch and execute computer-readable processor-executable instructions stored in the memory 322, 324, 358 and 360.

The touch panel processor, in some embodiments, can comprise the Cirque Cortex microcontroller chip, having an analog front end (AFE), a multiplexer and a microcontroller.

The secure processor receives inputs from the custom processor 381 equipped with a magnetic stripe interface 383, an integrated circuit interface 385 and a near field communication (NFC) interface 387.

All inputs received by the consumer terminal are received at the touch panel 393 within the secure enclave 370 (for example, as entries into a payment application or a register-buddy application in communication with the merchant terminal). Inputs received at the touch panel 393 are sent to the touch panel processor 389 having a multiplexer 390. The touch panel processor 389 is configured to put the consumer terminal into (1) a secure mode where secure data does not leave the enclave 370, and (2) a normal pass-through mode when the secure processor determines completion of the secure data entry, where data is passed through to the main processor 350. All entries into the touch panel are received at the secure enclave and initially handled by the secure processor. When in the pass-through mode, the secure processor passes all inputs through to the main processor. When in the secure touch mode, the secure processor does not pass any inputs to the main processor, but rather processes the data within the secure enclave.

A multiplexer 390 receives inputs from a touch panel 393 and directs inputs to the main processor 350, via the touch panel driver in a pass-through mode, and directs inputs received in the touch panel to the secure processor when in the secure mode. In some embodiments, the main processor on the merchant terminal and the consumer terminal will each run their own operating system (including possibly two different copies of the same operating system, different versions of the same operating system, or different operating systems altogether, etc.).

Figure 4:
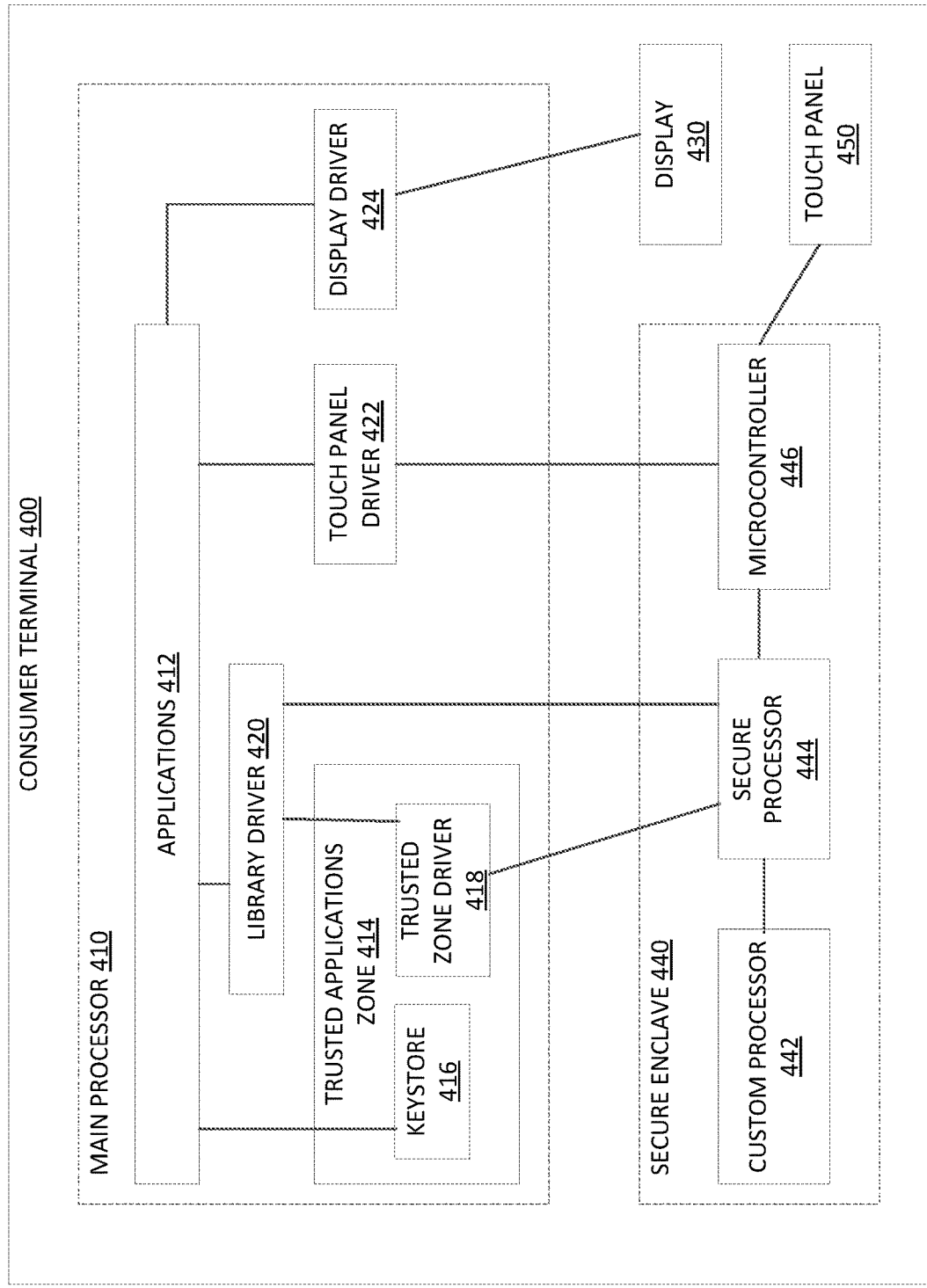
FIG. 4 illustrates an example schematic block diagram of components of the consumer terminal used in a point-of-sale system in accordance with various embodiments.

Reference is now made to FIG. 4 illustrating an example schematic block diagram of components of the consumer terminal used in a point-of-sale system in accordance with various embodiments. The consumer terminal 400 can be a computing device such as a tablet, mobile phone, or other portable computing device. The consumer terminal 400 includes a main processor 410, which can be a SoC processor, having a plurality of applications 412 for performing the various functions of the consumer terminal 400. A trusted applications zone 414 provides for an area within memory of the main SoC processor 410 (also referred to herein as a "non-secure" processor) that has a plurality of applications that perform various functions, such as secure storing of data, including a private key of communication certificates. The trusted application zone 414 comprises a plurality of applications, each having a set of instructions that are preprogrammed and are configured to be carried out by the main processor 410. The trusted applications zone 414 can include a keystore 416 for storing private keys and a driver 418 for controlling communications to and from the trusted applications zone 414.

The main processor 410 can be a system on chip (SoC) processor or other appropriate processor configured to perform the features shown and described herein. In some embodiments, the main processor 410 can be replaced with a plurality of specific-purpose processors and/or microcontrollers.

The main processor 410 also includes a library driver 420 which is a platform-independent library through which the applications 412 can control the secure enclave 440, including processing of a physical payment method. The library driver 420 is composed of a core card reader layer which is responsible for maintaining the state of the secure enclave 440 and responsible for message routing. In some instances, the communication to the secure enclave 440 is encrypted, and the communication to the secure enclave 440 is unencrypted in some instances. The driver 420 interfaces directly to an application in the trusted applications zone 414 which has secure access to a symmetric key stored in the keystore 416 which is shared with the secure enclave 440. The secure enclave 440 is a physically secure area within the consumer terminal, having specified secure endpoints of the physically secure area.

The main processor 410 includes a touch panel driver 422 that is in communication with the secure enclave 400. The main processor 410 also includes a display driver 424 in communication with a display 430 of the consumer terminal 400.

The secure enclave 440 includes a custom processor 442, a secure processor 444 and a microcontroller 446. The custom processor 442 is responsible for contact and contactless payments flow, including the physical interface to a payment object reader. In some embodiments, the custom processor 442 can include an integrated circuit (IC) payment object interface, an EMV interface and a near field communication (NFC) interface. The microcontroller 446 within the secure enclave 440 creates encrypted inputs from signals received from the multiplexer. The microcontroller 446 receives inputs to the touch panel 450. The touch panel 450 can be a capacitive touch panel to detect contact with an object having capacitive properties, such as a dielectric current, that differs from ambient air, such as the touch from a finger or a stylus. An analog front end (AFE) of the microcontroller 446 receives inputs from the touch panel 450 and the microcontroller 446 translates the touch inputs into PIN digits. When the main processor 410 and secure enclave 440 are in the pass-through mode, the inputs to the touch panel 450 are passed through to the touch panel driver 422 and then through to the applications 412 of the main processor 410.

Upon receiving a PIN entry request from the non-secure processor 410, the secure processor 444 instructs the non-secure processor 410 to enter a secure touch mode. During the secure touch mode, the microcontroller 446 does not pass any data received from the touch panel 450 through to the non-secure processor 410, but rather the inputs received at the microcontroller 446 are processed by the secure processor 444. The secure enclave 440 creates encrypted PIN data, for example, for performing online transactions.

Communication between the various components of the consumer terminal can occur via messages that are sent using an appropriate communication protocol, for example, over SPI (serial peripheral interface) bus. In some embodiments, communication between the secure processor 444 and the main processor 410 occurs over SPI bus, communication between the security processor 444 and the custom processor 442 occurs over UART (Universal Asynchronous Receiver/Transmitter) link, and communication between the security processor 44 and the microcontroller 445 occurs over I2C (Inter-IC) bus. The microcontroller is responsible for translating signals from the analog front end into messages over I2C that go either to the main processor 410 or to the secure processor, depending upon if the device is in secure touch mode or pass-through mode.

Because SPI is a master-slave protocol, there will be a GIPO (general purpose input/output) pin which the secure enclave 440 uses to signal to the main processor 410 that there is data to be read from the secure enclave 440.

The SPI communication bus between the main application processor 410 and the secure enclave 440 is physically-protected, and can also provide for logic protection of the secure touch mode and payments-related messages. By encrypting and authenticating messages between the corresponding communications between the main processor 410 and the secure enclave 440.

To achieve logic protection of the secure touch events and related messages, in some embodiments a symmetric key is provisioned at time of manufacture and used with AES (Advanced Encryption Standard) in CCM (counter with CBC-MAC) mode. The provisioning process consists of first injecting a secure enclave key at factory security configuration at FATP. Second, at customer shipping image station, the final shipping image is loaded. Third, when the final shipping image boots, the main processor code generates a keypair. Fourth, the main processor initiates standard ECDH (Elliptic curve Diffie-Hellman) agreement with the secure enclave. Other anonymous key agreement protocols can be implemented, that allow each party having a key pair to establish a secure channel. Fifth, the secure enclave generates a keypair. The final result is that both sides derive the shared AES key after the exchange.

By providing a secure touch mode, this prevents secure data from being accessible at the non-secure processor, or for example, by a potential hacker from accessing the communication line between the secure enclave 440 and the main processor 410. This can prevent hackers and other attackers from obtaining secure touch events from the touch panel. To avoid this scenario, the secure enclave defaults to a "no-touch" mode where the touch event data is not passed to the main processor 410, yet the secure enclave 440 is not in the secure touch mode for PIN entry. In the no-touch mode, the touch inputs are received at the touch panel but the microcontroller does not transmit the values anywhere, they are simply received and no information is retained or otherwise processed. In some embodiments, the main processor must request to enter pass-through mode using an authenticated message when in the default no-touch mode. If the secure enclave 440 has been tampered with, it will no longer have the key to authenticate this message, and therefore will no longer pass tough events through to the main processor 410.

Figure 5:
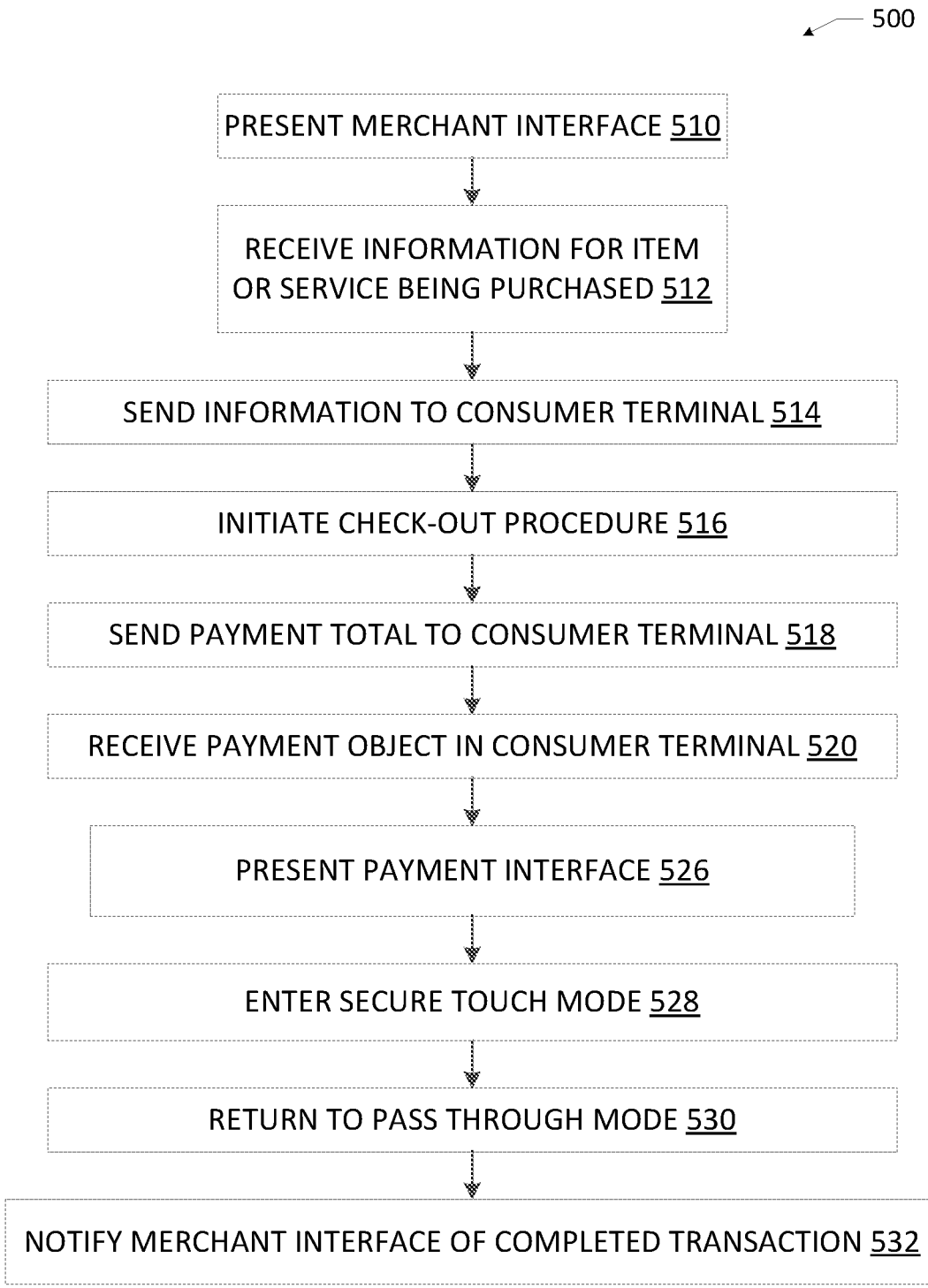
FIG. 5 illustrates an example diagram of flow of data for conducting a point-of-sale transaction in accordance with various embodiments.

FIG. 5 illustrates an example diagram of flow of data for conducting a point-of-sale transaction in accordance with various embodiments. In the example process 500, a merchant interface is presented 510 on the merchant device of the merchant terminal and information regarding an item or a service being purchased is received 512 at the merchant terminal. Information is sent from the merchant terminal to a consumer terminal 514 and a check-out procedure is initiated 516 by either the merchant terminal or the customer terminal. The payment total is sent to the consumer terminal 518 (for example, displayed on display 366 of FIG. 3, or display 430 of FIG. 4) and the payment object is received in the consumer terminal 520. The payment object can be cash, a payment card, an NFC enabled payment object, an integrated circuit (IC) chip enabled payment object, or other payment object that interacts with an interface of the consumer terminal (for example interfaces 383, 385 and 387 of FIG. 3).

Referring back to FIG. 5, at 526, a payment interface is presented on the consumer terminal. In some embodiments, the payment interface can be specific to the type of payment object received in the consumer terminal. For example, a signature interface can be presented for a magnetic stripe-type of payment object, or a pin pad can be presented for an IC or NFC enabled payment object.

Upon receiving a PIN entry request, the non-secure processor enters a secure touch mode at 528. Instructing the non-secure processor to enter the secure touch mode can be performed by the secure processor transmitting a message to the non-secure processor in some embodiments. During the secure touch mode, inputs received at the microcontroller from the touch panel are not sent to the non-secure processor, but are rather processed by the secure processor. Upon completion of the PIN entry, the non-secure processor returns to the pass-through mode at 530. Instructing the non-secure processor to exit the secure touch mode and return to the pass-through mode can be performed by the secure processor transmitting a message to the non-secure processor, or by completion of touch input from the consumer in some embodiments. For example, inactivity at touch panel for a predetermined amount of time can indicate completion of touch input by the consumer, and trigger the non-secure processor to exit the secure touch mode and return to the pass-through mode. The non-secure processor can also transmit an acknowledgement message to the secure processor, indicating to the secure processor that the non-secure processor has exited the secure touch mode and returned to the pass-through mode. In the pass-through mode, inputs received at the microcontroller from the touch panel are passed through to the non-secure processor for further processing. At 532, the merchant interface is notified of the completed transaction. For example, the notification can occur by one of the processors of the consumer terminal sending a message to the processor of the main terminal.

Figure 6:
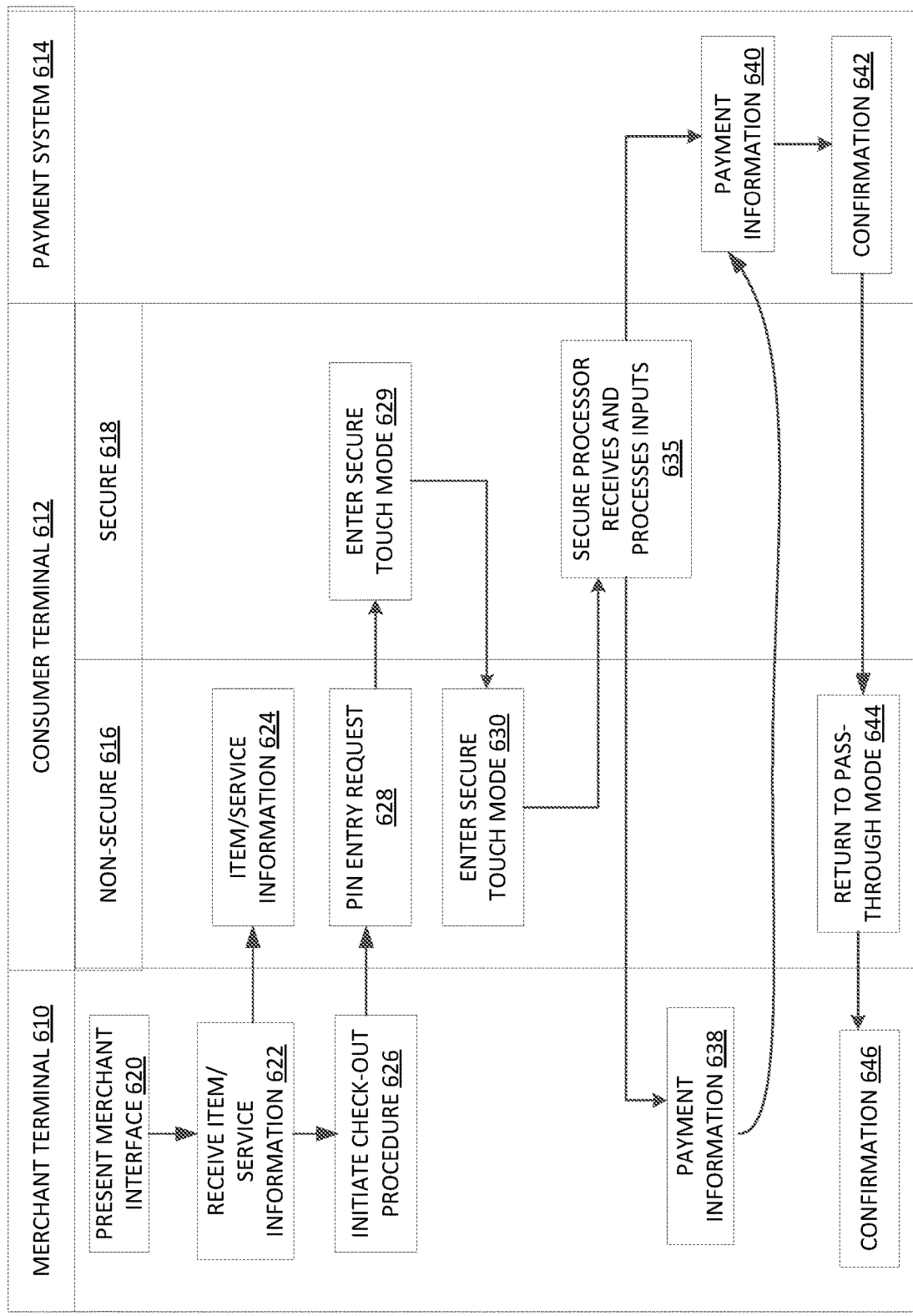
FIG. 6 illustrates an example diagram of flow of data between the components of the point-of-sale system in accordance with various embodiments.

FIG. 6 illustrates an example diagram of flow of data between the components of the point-of-sale system in accordance with an embodiment. The flow of data between the merchant terminal 610, the consumer terminal 612 and the payment system 614 are shown. The consumer terminal 612 includes the flow of data to and from both the non-secure processor 616 and the secure processor 618. The non-secure processor 616, for example, can be the processor 350 of FIG. 3, or processor 410 of FIG. 4, and the secure processor, for example, can be the secure processor 372 in FIG. 3, or secure processor 444 in FIG. 4.

In accordance with the example diagram, a merchant interface is presented 620 at the merchant terminal 610. The item or service information is received at 622 at the merchant terminal 610 and then provided to the non-secure processor 616 to display the item or service information at 624 on a display of the consumer terminal 612. At 626, the check-out procedure is initiated by the merchant terminal 610 once all items and/or services have been entered. Upon receipt of a PIN entry request at 628, the secure processor determines it is appropriate to enter the secure touch mode at 629, and the secure processor instructs the non-secure processor 616 to enter a secure touch mode at 630. At 635, the secure processor 618 then receives and processes inputs that are received by the microcontroller from the touch panel, and the inputs are transmitted from the microcontroller to the secure processor. The payment information is received, at 640, at the payment system 614. In some embodiments, the secure processor sends the payment information, after being encrypted or otherwise rendered secure, directly to the merchant terminal at 638 for further processing prior to being received at 640 at the payment system. The payment system 614 can provide a confirmation at 642, which can be provided at 644 to the secure processor 618. The confirmation at the secure processor 618 can be used to instruct the non-secure processor 616 to return to a pass-through mode at 644. The confirmation can also be provided to the merchant terminal 610 at 646 such that the merchant terminal can complete the transaction.

Figure 7:
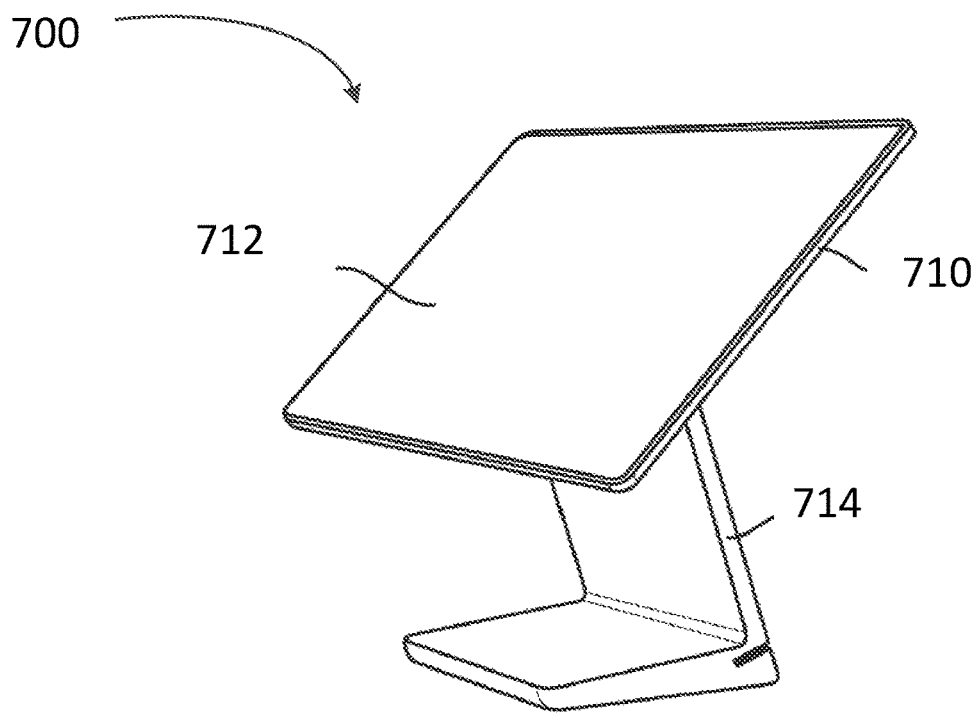
FIG. 7 illustrates an example point-of-sale system as viewed from a front perspective view, including a first terminal and a second terminal that are detachably mated together and shown in a fixed position, in accordance with various embodiments.

FIGS. 7-10 illustrate an example point-of-sale system 700. FIG. 7 illustrates an example point-of-sale system 700 as viewed from a front perspective view, including a first terminal and a second terminal that are detachably mated together and shown in a fixed position, in accordance with an embodiment. The point-of-sale system 700 includes a first terminal 710 configured, for example, to be a merchant terminal in a merchant-facing direction. The first terminal 710 includes a first computing device 712 and a base 714 into which the second terminal is detachably received. The first computing device 712 can be a separate device that is inserted into the terminal or formed integral into the terminal as a single, unitary structure.

Figure 8:
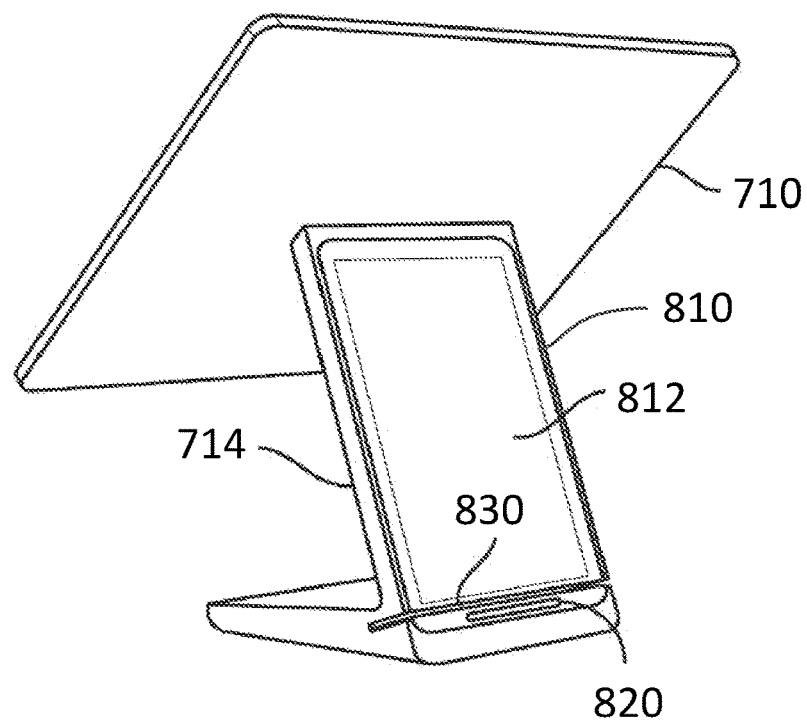
FIG. 8 illustrates the example point-of-sale system of FIG. 7 as viewed from a back perspective view, in accordance with various embodiments.

FIG. 8 illustrates the example point-of-sale system of FIG. 7 as viewed from a back perspective view, in accordance with some embodiments. The base 714 of the first terminal 710 detachably receives the second terminal 810. The second terminal 810 can include a first "dip slot" card reader 820 configured to read chip-type cards and a second "swipe slot" card reader 830 configured to read magnetic swipe-type cards. The term "dip slot" refers to a slot or other opening configured to receive or otherwise read a chip-type card via contact or contact-less EMV or NFC communication. In some embodiments, a separate NFC interface can be provided on the second terminal 810. In some embodiments, the card reader 820 and the card reader 830 can be replaced with a single hybrid card reader configured to accept both chip-type card and magnetic stripe-type cards, as well as NFC enabled payment objects.

The first terminal 710 can be a merchant terminal capable of performing the various functionalities and features as shown and described herein. In some embodiments, the first terminal 710 can be the merchant terminal 310 shown in FIG. 3. The second terminal 810 can be a consumer terminal capable of performing the various functionalities and features as shown and described herein. In some embodiments, the second terminal 810 can be the consumer terminal 312 shown in FIG. 3, or the consumer terminal 400 shown in FIG. 4.

Figure 9:
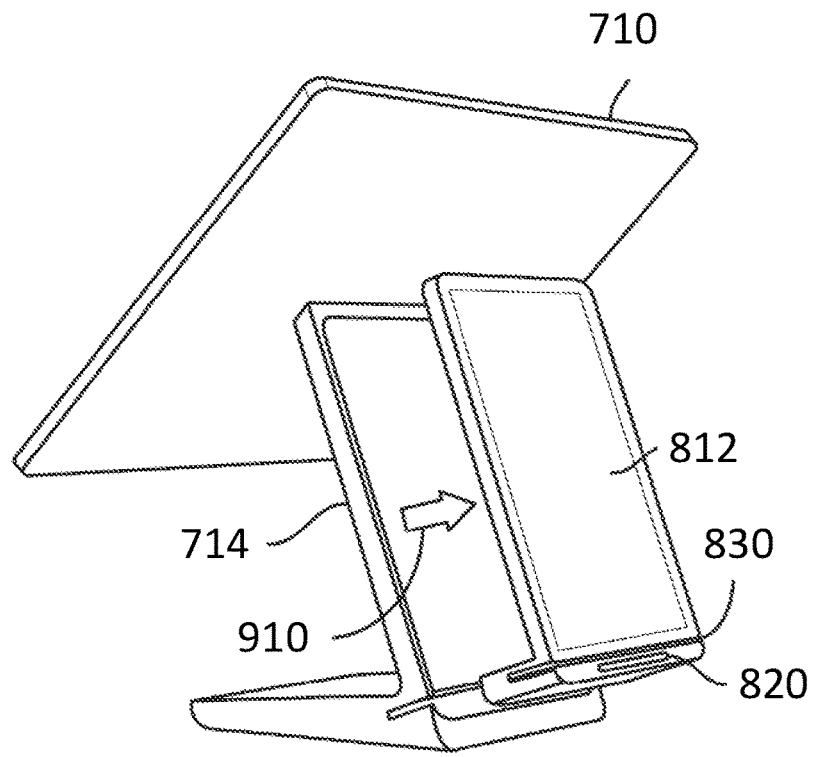
FIG. 9 illustrates the example point-of-sale system of FIG. 7 as viewed from the back perspective view, and showing the second terminal being separated from the first terminal, in accordance with various embodiments.

FIG. 9 illustrates the example point-of-sale system of FIG. 7 as viewed from the back perspective view, and showing the second terminal 810 being separated with ease from the first terminal 710, as shown by arrow 910.

Figure 10:
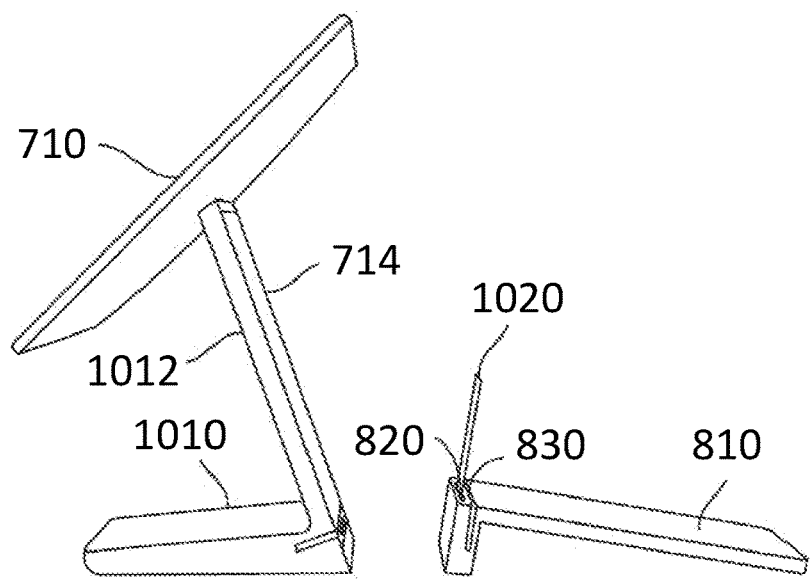
FIG. 10 illustrates the example point-of-sale system of FIG. 7 as viewed from a side perspective view and showing the second terminal completely separated from the first terminal, in accordance with various embodiments.

FIG. 10 illustrates the example point-of-sale system of FIG. 7 as viewed from a side perspective view and showing the second terminal completely separated from the first terminal. In this view, each terminal can be physically independent of the other and arranged in a separated position, or mated together as shown in FIG. 7. When separated as shown in FIG. 10, the first terminal and the second terminal are in communication with each other or otherwise mated together via wired or wireless communication. As shown in FIG. 10, the first terminal 710 includes a base 714 having a substantially flat portion 1010 that contacts a surface for supporting the first terminal 710 and an upper portion 1012. A payment card 1020 is shown inserted in the card reader 820 of the second terminal 810. The thin wedge shape of the second terminal 810 welcomes customers to pick up and hold the second terminal 810 for usage of the terminal.

Figure 11:
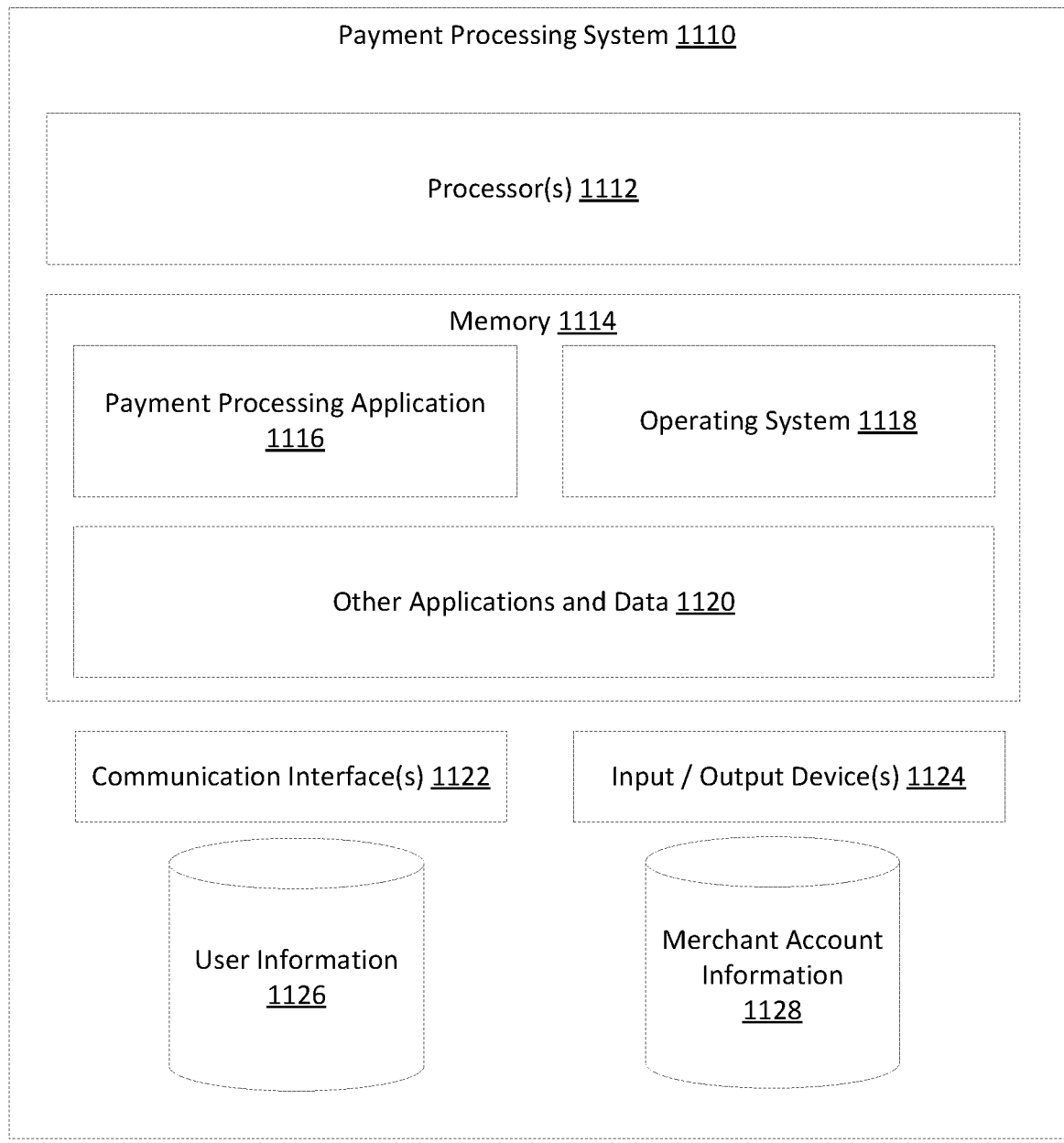
FIG. 11 illustrates an example block diagram of components of a payment processing system.

FIG. 11 is a block diagram illustrating select components of an example payment processing system 1110 according to some embodiments. The payment processing system 1110 can comprise the payment processing system 102 in an example embodiment. The payment processing system 1110 can be any suitable type of computing device capable of sending communications and performing the functions according to the techniques described herein and can be operated by a service provider that provides the payment processing service. For instance, in the case of a server, the applications, other functional components, and data can be implemented on a single server, a cluster of servers, a server farm or data center, a cloud-hosted computing service, a cloud-hosted storage service, and so forth, although other computer architectures can additionally or alternatively be used.

The payment processing system 1110 enables a service provider to provide a payment service in which merchants are able to conduct POS transactions with a plurality of buyers, such as for selling services and/or products to the buyers. The payment processing system 1110 can include one or more processor(s) 1112 (or servers) that are configured to process secure electronic financial transactions, e.g., payment during a POS transaction, by communicating with the merchant device, card payment networks, and bank or other financial institution payment systems. The payment processing system 1110 includes a payment processing application 1116 that receives transaction information for processing payments made through the merchant application. For example, the payment processing application 1116 can receive transaction information, such as an amount of the transaction, and can verify that a particular payment card can be used to pay for the transaction, such as by contacting a card clearinghouse of a card payment network. Furthermore, in some examples, the payment processing application 1116 can redirect payment information for transactions to be made using payment cards to a bank, or other financial institution, payment system. In other embodiments, the merchant device can communicate directly with an appropriate card payment network or bank payment system for approving or denying a transaction using a particular payment card for a POS transaction.

As used herein, the term "payment card," "payment object," or "payment instrument" refers to a payment mechanism which includes a debit card, a conventional credit card, "smartcards" that have embedded circuits, such as integrated circuit (IC) cards (e.g., Europay-MasterCard-Visa (EMV) cards), and NFC enabled payment cards, or any wallet-size card which functions as a combination of any of these payment mechanisms. In some embodiments, a payment card, payment object, or payment instrument can also include a virtual payment card stored on a device such as a smart phone or other device and transmittable, for example, via near field communication (NFC) or other suitable means.

Further, while the examples herein illustrate the components and data of the payment processing system 1110 as being present in a single location, these components and data can alternatively be distributed across different computing devices and different locations. Consequently, the functions can be implemented by one or more computing devices, with the various functionality described above distributed in various ways across the different computing devices, to collectively implement the payment processing system 1110. Multiple payment processing systems 1110 can be located together or separately, and organized, for example, as virtual servers, server banks and/or server farms. The described functionality can be provided by the servers of a single entity or enterprise, or can be provided by the servers and/or services of multiple different buyers or enterprises.

In the example of FIG. 11, the payment processing system 1110 includes one or more processors 1112, one or more memory devices 1114, one or more communication interfaces 1122, and one or more input/output devices 1124. These components can be similar to those described above with reference to FIG. 1 and elsewhere herein.

The memory 1114 can be used to store and maintain any number of functional components or applications that are executable by the processor 1112. In some embodiments, these functional components comprise instructions or programs that are executable by the processor 1112 and that, when executed; implement operational logic for performing the actions and services attributed above to the payment processing system 1110. Functional components of the payment processing system 1110 stored in the memory 1114 can include the payment processing application 1116, the operating system 1218, and other applications and data 1120. These components can be similar to those described with reference to FIG. 1 and elsewhere herein. In addition, the memory 1114 can store data used for performing the operations described herein. Thus, the memory 1114 can store merchant information 1126, including the merchant profiles. Further, the payment processing system 1110 can include many other logical, programmatic and physical components, of which those described above are merely examples that are related to the discussion herein.

For clarity of explanation, in some instances the present technology can be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter can have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method of processing inputs received at a touch screen display of a point-of-sale system, the method comprising:
   executing, by a main processor, an application configured to display a plurality of screens on the touch screen display during a point-of-sale transaction;
   receiving, at a secure processor, a request for secure data from the main processor during the point-of-sale transaction;
   instructing, by the secure processor in response to the request for secure data, the main processor to enter a secure touch mode such that touch events received at a touch panel of the touch screen display are not transmitted to the main processor;
   processing, by the secure processor, the touch events received at the touch panel during operation in the secure touch mode;
   determining, by the secure processor, that the request for secure data is complete; and
   instructing, by the secure processor in response to the determination that the request for secure data is complete, the main processor to exit the secure touch mode and enter a pass-through mode, wherein touch events received at the touch panel during operation in the pass-through mode are provided to the main processor for processing.

2. The method of claim 1, further comprising operating the main processor in the pass-through mode at a commencement of the point-of-sale transaction, wherein touch events received at the touch panel and associated with the point-of-sale transaction are provided to the main processor for processing.

3. The method of claim 1, further comprising:
   receiving, at the touch panel of the touch screen display, additional touch events after exiting the secure touch mode and entering the pass-through mode; and
   processing, by the main processor, the additional touch events received during operation in the pass-through mode.

4. The method of claim 1, further comprising receiving the touch events at a microcontroller connected to the touch panel.

5. The method of claim 4, further comprising
   providing, by the microcontroller, the touch events from the touch panel to the main processor during operation in the pass-through mode; and
   providing, by the microcontroller, the touch events from the touch panel to the secure processor during operation in the secure touch mode.

6. The method of claim 1, wherein determining that the request for secure data is complete includes determining whether entry of touch events by a user at the touch panel during operation in the secure touch mode is complete.

7. The method of claim 6, wherein determining whether entry of touch events by a user at the touch panel during operation in the secure touch mode is complete includes determining that inactivity at the touch panel for a predetermined time period has occurred.

8. The method of claim 1, wherein processing the touch events received at the touch panel during operation in the secure touch mode includes encrypting the touch inputs from the touch panel.

9. The method of claim 1, wherein receiving a request for secure data includes receiving a request for personal identification number (PIN) entry.

10. The method of claim 9, wherein determining that the request for secure data is complete includes determining that PIN entry is complete.

11. A consumer terminal comprising:
    a touch screen display;
    a main processor in a non-secure area of the consumer terminal, the main processor configured to display a plurality of screens on the touch screen display during a point-of-sale transaction; and
    a secure processor in a physically secure area of the consumer terminal, the secure processor connected to the main processor and configured to instruct the main processor to enter a secure touch mode in response to a request for secure data from the main processor during the point-of-sale transaction, wherein touch events received at a touch panel of the touch screen display during operation in the secure touch mode are processed by the secure processor and are not transmitted to the main processor, the secure processor further configured to instruct the main processor to exit the secure touch mode and enter a pass-through mode upon a determination by the secure processor that the request for secure data is complete, wherein touch events received at the touch panel during operation in the pass-through mode are provided to the main processor for processing.

12. The consumer terminal of claim 11, further comprising a custom processor in the physically secure area, the custom processor having at least one interface to receive data from a payment object used with a payment reader during the point-of-sale transaction.

13. The consumer terminal of claim 12, wherein the at least one interface includes an integrated circuit (IC) chip-enabled interface configured to read data from an IC chip-enabled payment object.

14. The consumer terminal of claim 12, wherein the at least one interface includes a near field communication (NFC) enabled interface configured to read data from an NFC-enabled payment object.

15. The consumer terminal of claim 11, further comprising a multiplexer in the physically secure area, the multiplexer connected to the touch panel to receive touch events from the touch panel and direct the touch events to the main processor when in the pass-through mode and direct the touch events to the secure processor when in the secure touch mode.

16. The consumer terminal of claim 11, wherein the secure processor provides the processed touch inputs to a payment system and receives a confirmation from the payment system, wherein the secure processor is configured to instruct the main processor to exit the secure touch mode and enter a pass-through mode upon receipt of the confirmation from the payment system.

17. A method of conducting a point-of-sale transaction, the method comprising:
- receiving, at a consumer terminal, a payment total for a point-of-sale transaction from a merchant terminal;
- receiving, at the consumer terminal, a payment object that interacts with a corresponding payment reader of the consumer terminal;
- displaying a payment interface on a touch screen display of the consumer terminal;
- receiving, at a secure processor of the consumer terminal, a request for secure data from a main processor of the consumer terminal upon displaying the payment interface;
- instructing, by the secure processor in response to the request for secure data, the main processor to transition from a pass-through mode to a secure touch mode, wherein in the secure touch mode, touch events received at a touch panel of the touch screen display are not transmitted to the main processor and in the pass-through mode, touch events received at the touch panel are provided to the main processor for processing;
- processing, by the secure processor, the touch events received at the touch panel during operation in the secure touch mode; and
- instructing, by the secure processor, the main processor to exit the secure touch mode and return to the pass-through mode in response to a determination that the request for secure data is complete.

18. The method of claim 17, further comprising:
- providing payment information from the secure processor to a payment system; and
- receiving a confirmation from the payment system by the secure processor.

19. The method of claim 18, wherein instructing, by the secure processor, the main processor to exit the secure touch mode and return to the pass-through mode occurs in response to the receipt of the confirmation from the payment system.

20. The method of claim 17, wherein receiving a request for secure data includes receiving a request for personal identification number (PIN) entry.

* * * * *